United States Patent [19]

Powell

[11] 4,079,984

[45] Mar. 21, 1978

[54] WIND DEFLECTOR FOR A TOWING VEHICLE

[76] Inventor: Jack N. Powell, Rte. 2, Leesburg, Ind. 46538

[21] Appl. No.: 732,329

[22] Filed: Oct. 14, 1976

[51] Int. Cl.² ............................................. B62D 35/00
[52] U.S. Cl. .................................. 296/1 S; 180/1 FV; 296/91
[58] Field of Search ............... 296/1 S, 91; 180/1 FV; 105/2 A

[56] References Cited

U.S. PATENT DOCUMENTS

| 3,894,764 | 7/1975 | Powell | 296/1 S |
| 3,999,796 | 12/1976 | Greene | 296/1 S |

Primary Examiner—Robert R. Song
Assistant Examiner—R. Schrecengost
Attorney, Agent, or Firm—Oltsch & Knoblock

[57] ABSTRACT

A wind deflector which is mounted spacedly above the roof of a vehicle towing a trailer and which includes a baffle at its leading edge to displace and direct air flow between the deflector and the vehicle roof for the purpose of improving the stability and ride of the vehicle and to reduce the formation of eddies in the air flow between the deflector and the trailer.

9 Claims, 4 Drawing Figures

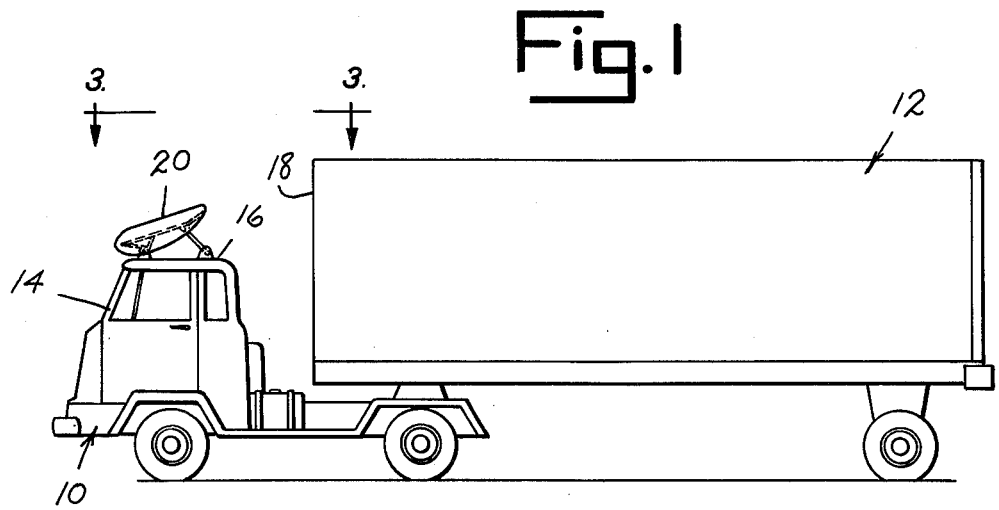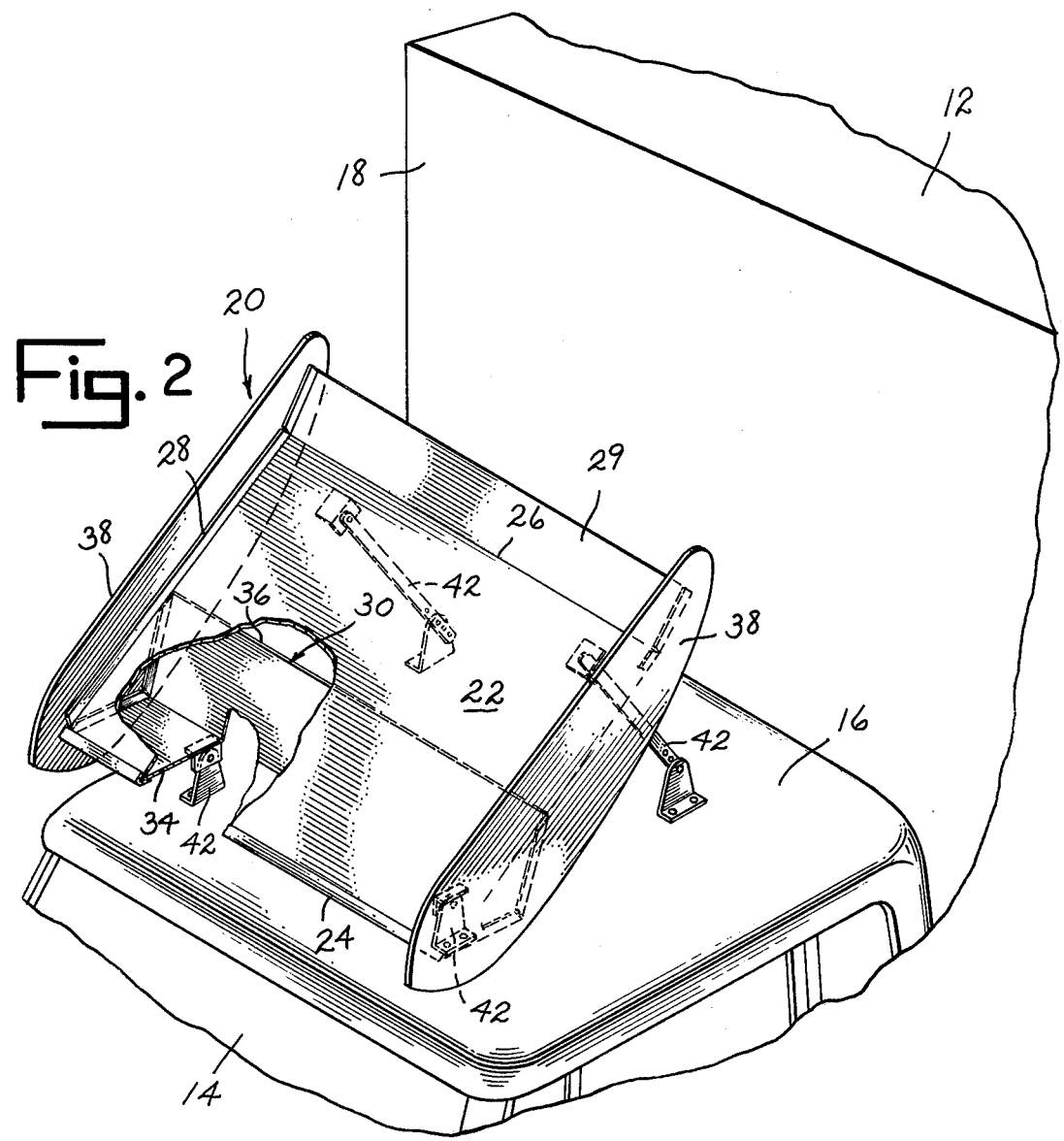

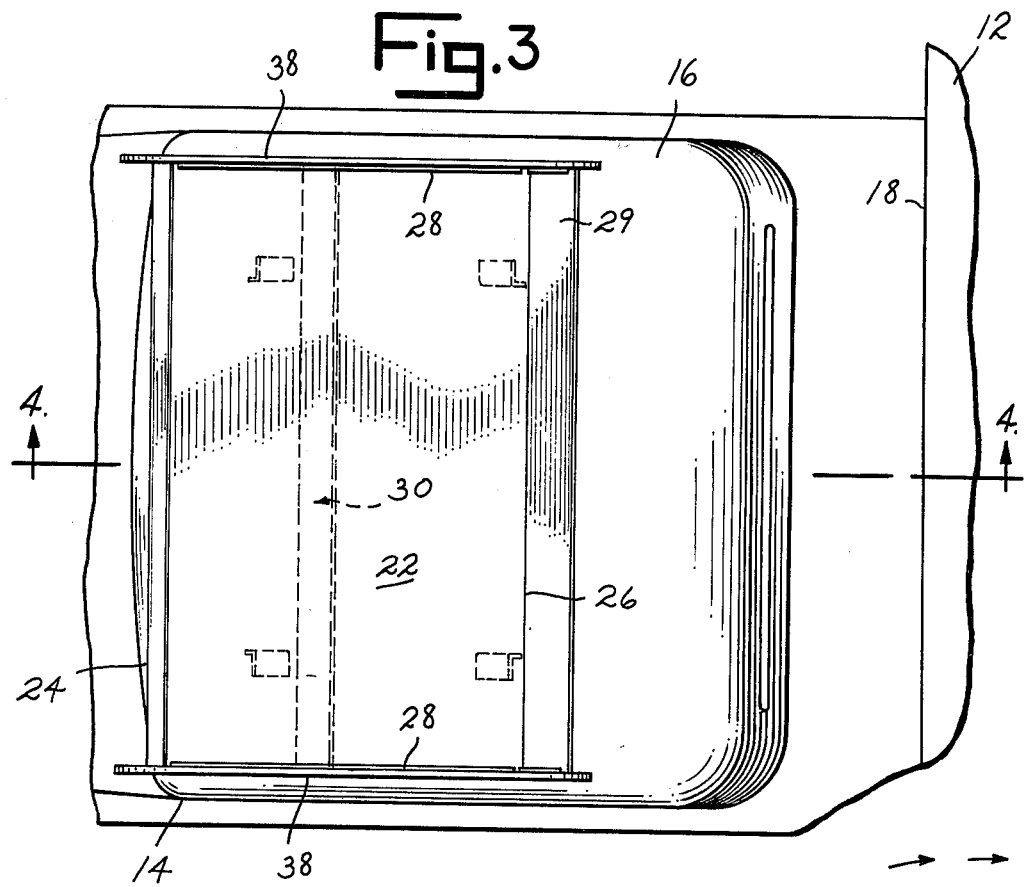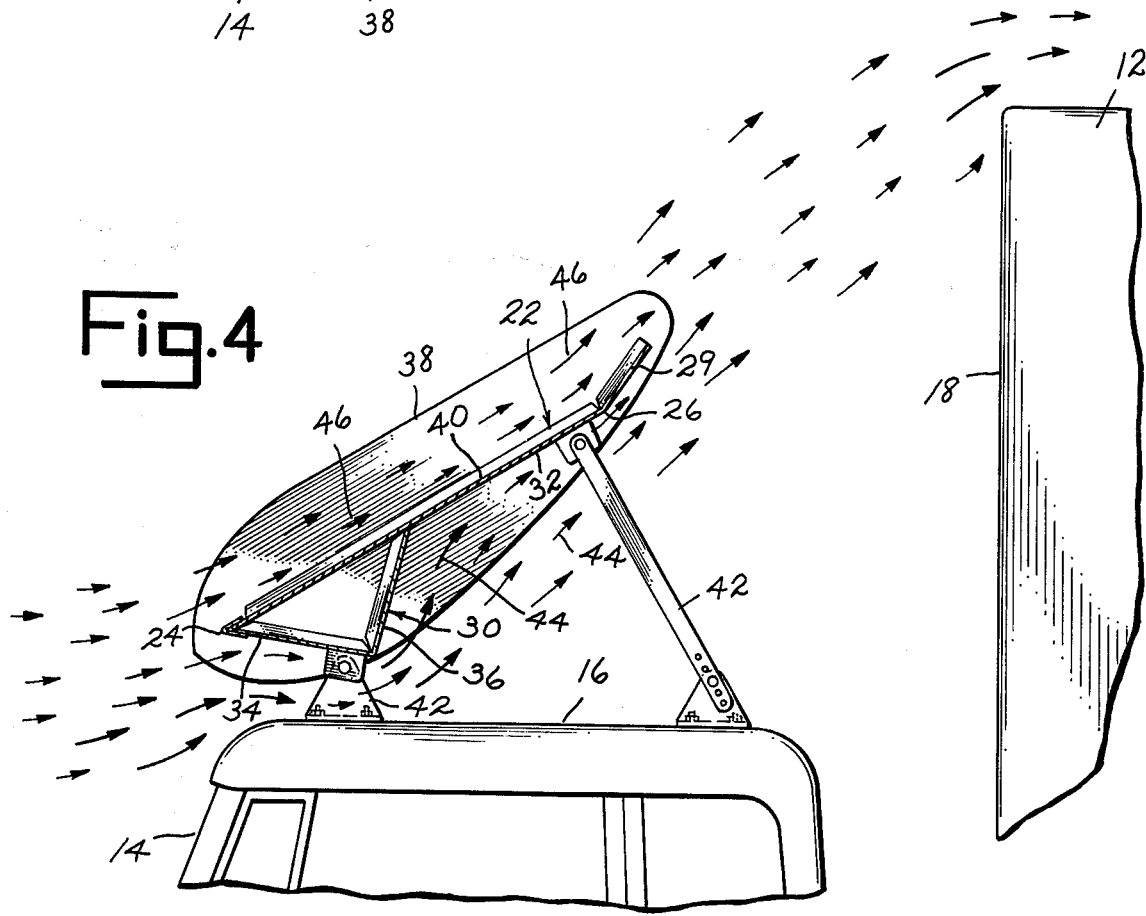

WIND DEFLECTOR FOR A TOWING VEHICLE

SUMMARY OF THE INVENTION

This invention relates to an improved wind deflector which is mounted to the roof of a vehicle towing a trailer.

The wind deflector of this invention includes a planr sheet part having a leading edge which is directed toward the front of the towing vehicle and a trailing edge which is directed toward the rear of the vehicle. The sheet part of the deflector carries a baffle at its leading edge. The baffle is spaced from the roof of the towing vehicle and serves to displace and direct air first downwardly under the sheet part at its leading edge and then upwardly along the lower surface of the sheet part in laminar fashion in front of the towed trailer. In this manner air flow eddies which were usually produced between the deflector and trailer in prior art deflectors are substantially reduced, and an increased downward force upon the towing vehicle is created to improve ride, handling and stability of the towing vehicle.

Accordingly, it is an object of this invention to provide a wind deflector which improves the ride and stability of a vehicle towing a trailer.

Another object of this invention is to provide a wind deflector for use upon a vehicle, such as the tractor of a semi-truck, for the purpose of deflecting air over the front wall of a towed trailer.

And still another object of this invention is to provide a wind deflector which is for use upon a vehicle towing a trailer and which is of economical construction.

And still another object of this invention is to provide a wind deflector used with a tractor pulling a trailer for the purpose of improving the gas mileage of the tractor and its ride and stability.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a view of a tractor and trailer as seen from the side having the air deflector of this invention mounted to the tractor.

FIG. 2 is a perspective view of the tractor and trailer of FIG. 1 showing the air deflector of this invention mounted to the roof of the tractor and having portions broken away for purposes of illustration.

FIG. 3 is a top plan view of the deflector of this invention mounted to the tractor and as seen from line 3—3 of FIG. 1.

FIG. 4 is a sectional view of the air deflector taken along line 4—4 of FIG. 3 with arrows illustrating the air flow about the deflector.

DESCRIPTION OF THE PREFERRED EMBODIMENT

The preferred embodiment illustrated is not intended to be exhaustive or to limit the invention to the precise form disclosed. It has been chosen and described in order to best explain the invention and its application and practical use to thereby enable others skilled in the art to best utilize the invention.

The towing vehicle 10 in FIG. 1 is depicted as a tractor having a trailer 12 coupled to it. Vehicle 10 includes a cab 14 having a roof 16. The forward wall 18 of trailer 12 extends above the level of vehicle roof 16. Wind deflector 20 is mounted to vehicle roof 16.

Deflector 20 includes a sheet part 22 having a leading edge 24 directed toward the front of vehicle 10 and a trailing edge 26 directed toward the rear of the towing vehicle and located above the level of leading edge 24. Sheet part 22 is planar and includes parallel side edges 28. An upturned deflector part 29 extends along the trailing edge 26 of sheet part 22.

A baffle, designated generally by the reference numeral 30, is carried at the lower surface 32 of sheet part 22 adjacent its leading edge 24. Baffle 30 includes a front surface part 34 and rear surface part 36. Baffle 30 extends from one side edge 28 to the other side edge 28 of sheet part 22. Front surface part 34 of the baffle joins sheet part leading edge 24 and extends rearwardly in a diverging direction from lower surface 32 of the sheet part. The junction of front surface part 34 and sheet part 22 at its leading edge 24 is of a generally abrupt V-shape. Rear surface part 36 of baffle 30 extends rearwardly and upwardly from the rear edge of front surface part 34 until it joins lower surface 32 of the sheet part between its leading edge 24 and trailing edge 26.

A fixed rudder 38 extends along each side edge 28 of sheet part 22. Rudders 38 extend above upper surface 40 of sheet part 22 and also below lower surface 32 of the sheet part. Baffle 30 and deflector part 29 both extend between rudders 38. Additionally, rudders 38 extend forwardly of leading edge 24 of sheet part 22.

Sheet part 22, baffle 30, deflector part 29 and rudders 38 may be formed of a light weight material, such as aluminum, with the baffle and deflector part not only regulating the direction of air flow about the deflector but also providing strength to the assembled components of the deflector.

Deflector 20 includes brackets 42 which mount sheet part 22 and the other assembled components of the deflector to roof 16 of vehicle cab 14. Brackets 42 position baffle 30 a substantial distance above the level of roof 16. In an actual working embodiment it was found that a spacing of four inches between the baffle and the roof of the towing vehicle provided the desired air flow about the deflector and around the following trailer. The rear pair of brackets 42 are adjustable to vary the angle of incline of sheet part 22 of the deflector, depending upon the distance the deflector is mounted from trailer 12 and the height of trailer forward wall 18. Additionally, the rear pair of brackets 42 may be constructed so as to allow sheet part 22 to be pivoted toward roof 16 at baffle 30 and placed in a collapsed or stored position when the deflector is not needed.

When the oncoming air contacts deflector 20 during movement of vehicle 10, baffle 30 acts as a displacement medium causing a portion of the air at the leading edge 24 of sheet part 22 to be diverted downwardly beneath the baffle along front surface part 34 and then upwardly along rear surface part 36 of the baffle and along lower surface 32 of sheet part 22, as illustrated by arrows 44. The remaining portion of the air contacting the deflector will pass over the leading edge 24 and along the upper surface 40 of sheet part 22, as illustrated by arrows 46. As the air indicated by arrows 44 passes around baffle 30, a substantial area of reduced or low pressure is created between sheet part 22 and roof 16 of vehicle 10 adjacently rearwardly of the baffle and generally laminar air flow is introduced along lower surface 32 of the sheet part. This reduces the formation of air flow eddies between the deflector and trailer forward wall 18 so as to reduce vibration transmitted by the deflector to the cab 14 of vehicle 10 and improves the flow of air around trailer 12. Additionally, the reduction in pressure beneath sheet part 22 and rearwardly of baffle 30 increases the downward force upon vehicle 10 created by the air striking the deflector so as to improve vehicle stability. The air flow passing about the upper surface 40 and lower surface 32 of sheet part 22 streams from trailing edge 26 of the sheet part and deflector part 29 in a laminar manner.

It is to be understood that the invention is not to be limited to the details above given, but may be modified within the scope of the appended claims.

What I claim is:

1. In combination a towing vehicle having a roof, a trailer connected to said vehicle, and a wind deflector mounted to said vehicle roof and positioned in front of said trailer for deflecting air flow over said trailer, the improvement wherein said deflector includes a sheet part having side edges extending between a leading edge directed toward the front of said vehicle and a trailing edge directed toward the rear of said vehicle, said sheet part having an upper planar surface and a lower surface, said sheet part trailing edge positioned above the level of said sheet part leading edge, baffle means spaced from said vehicle roof and carried at the lower surface of said sheet part adjacent said sheet part leading edge, said baffle means extending from one side edge to the other side edge of said sheet part and including a front surface section extending from the leading edge of the sheet part divergently away from said sheet part lower surface and a rear surface section extending rearwardly from said front surface section and adjoining said lower surface of the sheet part at a location spaced between said leading and trailing edges of the sheet part, said baffle means for displacing air contacting said leading edge of the sheet part and causing a part of said air to be diverted first under and away from said sheet part and then toward said sheet part lower surface between said baffle means rear surface section and sheet part trailing edge to reduce air flow eddies between said sheet part and trailer and to create an increased downward force upon said vehicle.

2. The combination of claim 1 wherein said baffle means front surface section and sheet part at its leading edge is defined by a V-shaped junction.

3. The combination of claim 2 wherein each of said baffle means front and rear surface sections are planar to form a two-sided baffle carried beneath said sheet part at its leading edge.

4. The combination of claim 1 and a rudder extending along each side edge of said sheet part, each rudder projecting above said sheet part upper surface.

5. The combination of claim 4 wherein each rudder extends below said sheet part lower surface, said baffle means extending between said rudders.

6. The combination of claim 5 wherein said rudders project forwardly of said sheet part leading edge.

7. The combination of claim 6 and a deflector part carried at the trailing edge of said sheet part, said deflector part angled away from said trailing edge and above the plane of said sheet part upper surface.

8. The combination of claim 7 wherein said deflector part extends between said rudders.

9. The combination of claim 1 wherein said rear surface section of the baffle means adjoins the lower surface of said sheet part at a location approximately midway between said leading and trailing edges of the sheet part.

* * * * *